(12) United States Patent
Nakamura et al.

(10) Patent No.: US 6,695,083 B2
(45) Date of Patent: Feb. 24, 2004

(54) SADDLE-MOUNTED TYPE FOUR-WHEEL VEHICLE

(75) Inventors: Eiichi Nakamura, Shizuoka (JP); Kazutatsu Suzuki, Shizuoka (JP); Mitsuhiro Sugimoto, Shizuoka (JP); Hiroyasu Yada, Shizuoka (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 89 days.

(21) Appl. No.: 10/012,385

(22) Filed: Dec. 12, 2001

(65) Prior Publication Data

US 2002/0134598 A1 Sep. 26, 2002

(30) Foreign Application Priority Data

Mar. 22, 2001 (JP) .......................................... 2001-083402

(51) Int. Cl.⁷ .......................... B60K 11/00; B60K 13/06
(52) U.S. Cl. ..................... 180/68.1; 180/68.3; 180/296; 180/225
(58) Field of Search .................. 180/68.1, 68.2, 180/68.3, 291, 296, 225, 229, 38, 233, 309, 69.4

(56) References Cited

U.S. PATENT DOCUMENTS

| | | | | |
|---|---|---|---|---|
| 4,496,019 A | * | 1/1985 | Tanaka ........................ | 180/215 |
| 4,497,285 A | * | 2/1985 | Kondo ....................... | 123/41.65 |
| 4,531,606 A | * | 7/1985 | Watanabe ................... | 180/210 |
| 4,596,301 A | * | 6/1986 | Nagashima ................ | 180/215 |
| 4,600,074 A | * | 7/1986 | Watanabe et al. .......... | 180/251 |
| 4,614,249 A | * | 9/1986 | Yamanaka ................. | 180/312 |
| 4,714,126 A | * | 12/1987 | Shinozaki et al. ......... | 180/233 |
| 4,722,415 A | * | 2/1988 | Takahashi .................. | 180/257 |
| 4,757,872 A | * | 7/1988 | Inomata ...................... | 180/291 |
| 4,821,685 A | * | 4/1989 | Matsushima et al. .. | 123/184.47 |
| 5,174,258 A | * | 12/1992 | Tanaka ..................... | 123/198 E |
| 5,176,111 A | * | 1/1993 | Nakamura et al. ....... | 123/41.01 |
| 5,251,718 A | * | 10/1993 | Inagawa et al. ............. | 180/190 |
| 5,330,028 A | * | 7/1994 | Handa et al. ................ | 180/219 |
| 5,575,352 A | * | 11/1996 | Suzuki et al. ............... | 180/311 |
| 5,620,217 A | * | 4/1997 | Ichikawa et al. ........... | 293/102 |
| 5,660,245 A | * | 8/1997 | Marier et al. ............... | 180/190 |
| 6,264,241 B1 | * | 7/2001 | Horiuchi ..................... | 280/781 |
| 6,289,866 B1 | * | 9/2001 | Tsuruta et al. .......... | 123/198 E |
| 6,454,040 B1 | * | 9/2002 | Fukuda ........................ | 180/374 |
| 6,533,060 B1 | * | 3/2003 | Seto ............................. | 180/337 |

FOREIGN PATENT DOCUMENTS

| | | |
|---|---|---|
| JP | 2843570 | 10/1998 |
| JP | 2963052 | 8/1999 |
| JP | 2000199463 | 7/2000 |

* cited by examiner

Primary Examiner—Brian L. Johnson
Assistant Examiner—Bridget Avery
(74) Attorney, Agent, or Firm—Greenblum & Bernstein, P.L.C.

(57) ABSTRACT

Separation of, or damage to, the inlet duct and outlet duct connected to a belt-type variable transmission is reduced, and durability of the belt-type variable transmission is improved, by preventing induction of foreign matter such as water, mud, sand or dust into the inlet duct. An induction box is provided between a front cover and a front upper part of a vehicle frame that extends above the front wheel axle shaft, and this induction box is fixed to a side of the vehicle frame. A cooling air induction port is provided in an upper face of the induction box adjacent to the bottom face of the front cover. A duct linkage port in the bottom face of the induction box and an air induction port of the belt-type variable transmission are connected by an inlet duct. A positioning element in the form of a fitting hook is formed unitarily and in one piece with the inlet duct on a middle portion of the inlet duct so that the positioning element positions the middle portion of the inlet duct with respect to structural members of the vehicle frame.

31 Claims, 9 Drawing Sheets

SADDLE-MOUNTED TYPE FOUR-WHEEL VEHICLE

BACKGROUND OF THE INVENTION

1. Field of the Invention

The present invention relates to a saddle-mounted type four-wheel vehicle constructed such that the engine output can be transmitted to the four front and rear wheels by means of a belt-type variable transmission. In more detail, it relates to a saddle-mounted type four-wheel vehicle wherein the frictional heat resulting from the operation of the belt-type variable transmission is removed by feeding cooling air from outside into the interior of this belt-type variable transmission.

2. Description of the Related Art

For example, as shown in documents such as Japanese Patent Publication No. 2843570, Japanese Patent Publication No. 2963052 and Japanese Laid-Open Patent Publication No. 2000-199463, saddle-mounted type four-wheel vehicles, wherein the four front and rear wheels are driven by variable transmission of engine output by means of a belt-type variable transmission, are known. In such systems, an induction box is fixed to a front cover that covers the front wheels and the top of the front of the vehicle frame. An inlet duct extending from this induction box is connected to a belt-type variable transmission, so as to prevent deterioration of the material of the belt by removing the frictional heat produced by operation of the belt-type variable transmission by feeding external air to the belt-type variable transmission as cooling air.

By connecting an inlet duct to the induction box provided on the front cover as described above, entry of foreign matter such as water, sand, mud or dust into the inlet duct can be effectively reduced and the resistance to air induction can be lowered by making the air current flowing into the inlet duct more uniform.

However, a change of the relative position of the induction box provided on the front cover with respect to the vehicle frame may result from factors such as running vibration or impacts. It has been noted that large relative changes in position between the belt-type variable transmission provided on the vehicle frame and the induction box provided on the front cover, causes separation of the inlet duct from the induction box or belt-type variable transmission. This may occur at the instant of a severe jolt to the vehicle due to running over objects or irregular terrain. Damage to the inlet duct may also occur. The same concerns also apply to the outlet duct through which cooling air that was fed into the belt-type variable transmission is evacuated.

SUMMARY OF THE INVENTION

In view of the problems described above, an object of the present invention is to reduce separation or damage to the inlet duct and outlet duct connected to the belt-type variable transmission and improve durability of the belt-type variable transmission. Other objects of the invention are to lower the air induction resistance, simplify the construction and improve the layout of the inlet duct by preventing induction of foreign matter such as water, mud, sand or dust into the inlet duct.

In order to achieve the aforementioned objects, a saddle-mounted type four-wheel vehicle according to the present invention includes a vehicle frame, left and right front wheels and rear wheels provided at the front and rear of the vehicle frame, an engine unit that includes an engine and belt-type variable transmission and is mounted on the vehicle frame between the front and rear wheels, a saddle-type seat provided at the top of the vehicle frame, a steering wheel provided in front of the seat, and a front cover that covers the front wheels and the upper front part of the vehicle frame. The upper front part of the vehicle frame extends to approximately above the front wheel axle shaft. An induction box is provided between the upper front part of the vehicle frame and the front cover. This induction box is fixed to the vehicle frame and includes a cooling air induction port provided in the upper face thereof adjacent to the bottom face of the front cover. A duct linkage port provided in the bottom face of the induction box and an air induction port provided in the belt-type variable transmission are connected by an inlet duct. A positioning element is formed on a portion of this inlet duct, in order to position the portion with respect to structural members of the vehicle frame. An outlet duct is connected with a discharge port provided in the belt-type variable transmission, and a cooling air discharge port is provided at the downstream end of this outlet duct.

With such a construction, separation of the inlet duct from the induction box or belt-type variable transmission, or damage thereto, can be prevented and it becomes difficult for foreign matter such as water, mud, sand or dust raised by the front wheels to be sucked into the inlet duct within the front cover during running of the saddle-mounted type four-wheel vehicle. Furthermore, the construction related to fixing of the inlet duct is simplified.

Also, with the saddle-mounted type four-wheel vehicle according to the present invention, the portion of the inlet duct at which the positioning element is formed may be a middle portion of the inlet duct. The positioning element may include a fitting hook that fits tightly on the surface of an upright portion constituting the front part of the vehicle frame, and a bottom face of the fitting hook that contacts a transverse portion that is joined to the upright portion. In this way, movement of the inlet duct with respect to the vehicle frame is restrained and separation of or damage to the inlet duct is more reliably prevented. It should be noted that the fitting hook can be of very simple construction.

Furthermore, with the saddle-mounted type four-wheel vehicle according to the present invention a heat exchanger of the engine unit is provided near the front of the vehicle frame, a cooling fan for cooling the engine unit is provided behind the heat exchanger, and the inlet duct is extended downwardly and rearwardly to pass between the heat exchanger and cooling fan and below the cooling fan, and is connected to the air induction port of the belt-type variable transmission. In this way, air induction resistance is reduced by reducing bending of the inlet duct to a minimum and the layout of the inlet duct is improved.

Also, with the saddle-mounted type four-wheel vehicle according to the present invention, the cooling air induction port of the induction box is arranged at a higher position than the cooling air discharge port of the outlet duct. The cooling air discharge port is at a lower position than the highest part of the outlet duct, and the cooling air discharge port is arranged on the front face side of the outlet duct. In this way, on entering or leaving a deep-water channel at a comparatively steep angle, penetration of water from the cooling air induction port of the induction box, or from the cooling air discharge port of the outlet duct, is prevented.

Also, with the saddle-mounted type four-wheel vehicle according to the present invention, another positioning element may be formed in a portion of the outlet duct in order to position the portion of the outlet duct with respect to the vehicle frame structural members. In this way, movement of the outlet duct with respect to the vehicle frame is restrained and separation of or damage to the outlet duct is reliably prevented.

Further, with the saddle-mounted type four-wheel vehicle according to the present invention, the portion of the outlet duct at which the positioning element is formed may be a middle portion of the outlet duct. The positioning element for the outlet duct may include a fitting hook that fits tightly on a cross member extending in the width direction and constituting part of the vehicle frame, an abutment portion that abuts on the side face of a structural member of the vehicle frame, and an engagement part that engages a corner formed by the side face and bottom face of an article accommodating box arranged below the seat. Since the fitting hook, abutment part and engagement part can be made of straightforward shape, while maintaining a straightforward construction of the outlet duct, positioning of the outlet duct can be reliably achieved while preventing separation thereof or damage thereto.

Also, with the saddle-mounted type four-wheel vehicle according to the present invention, a forwardly descending portion is formed at the upper front part of the vehicle frame, the induction box is arranged above this forwardly descending portion, and includes a chamber portion formed at the front of the induction box such that the bottom face of the chamber portion extends downwards with a shape substantially corresponding to the shape of the forwardly descending portion. A water discharge hole is provided at the lowest part of this chamber portion. In this way, a large induction box capacity can be ensured, lowering the air induction resistance and enabling moisture that has penetrated into the induction box to escape effectively.

Also, with the saddle-mounted type four-wheel vehicle according to the present invention, the upstream part of the inlet duct projects into the interior of the induction box through the duct linkage port, and bends in a direction away from the cooling air induction port within the induction box. The opening thereof is positioned higher than the bottom face of the induction box. In this way, even if water penetrates into the induction box from the cooling air induction aperture, it is difficult for this water to be sucked into the inlet duct.

Further, with the saddle-mounted type four-wheel vehicle according to the present invention, screening plates extend from the upper face of the induction box and surround the cooling air induction port of the induction box. An air intake guide protrudes above the front cover and a cooling air intake port is formed in front of this air intake guide. The screening plates project within the protruding shape of the air intake guide. In this way, foreign matter such as water, mud, sand or dust that has been raised by the front wheels within the front cover during running cannot easily enter the cooling air induction port of the induction box, since it is obstructed by the screening plate.

Also, with the saddle-mounted type four-wheel vehicle according to the present invention, the bottom face of the induction box is inclined, the cooling air induction port being positioned above the lowest part of this inclination. A guide cylinder surrounding the cooling air induction port extends within the induction box, extending towards the lowest part of the inclined bottom face of the induction box. In this way, once air that has been sucked in from the cooling air induction port has flowed to the bottom of the induction box, it flows into the inlet duct that opens thereabove, so that foreign matter (in particular moisture) contained in the inducted air is separated from the air current and is not easily sucked into the inlet duct.

Also, with the saddle-mounted type four-wheel vehicle according to the present invention, the screening plate positioned at the front edge of the cooling air induction port is a perforated plate. In this way, entry of foreign matter into the cooling air induction port can be prevented and the air induction resistance can be lowered.

Furthermore, with the saddle-mounted type four-wheel vehicle according to the present invention, a gap is provided between the tips of said screening plates and said air intake guide. In this way, there is no possibility of mutual contact of the screening plate and the air intake guide during running, so generation of abnormal noise and/or damage can be prevented.

In order achieve the aforementioned objects, an air cooling system for a vehicle transmission according to the present invention includes an induction box fixed to a vehicle frame and including a cooling air induction port provided in the upper face thereof. A duct linkage port provided in the bottom face of the induction box and an air induction port provided in the vehicle transmission are connected by an inlet duct. A positioning element is formed on a portion of this inlet duct, in order to position the portion with respect to structural members of the vehicle frame. An outlet duct is connected with a discharge port provided in the vehicle transmission, and a cooling air discharge port is provided at the downstream end of this outlet duct.

In order achieve the aforementioned objects, an air cooling system for a vehicle transmission according to the present invention includes an induction box provided between an upper front part of a vehicle frame and a vehicle front cover. The induction box is fixed to the vehicle frame and includes a cooling air induction port in an upper face thereof adjacent to a bottom face of the front cover. The induction box further includes a duct linkage port in a bottom face thereof for connection of an inlet duct thereto.

BRIEF DESCRIPTION OF THE DRAWINGS

The above and other objects, features and advantages of the present invention will be made apparent from the following description of the preferred embodiments, given as non-limiting examples, with reference to the accompanying drawings, in which.

DESCRIPTION OF THE PREFERRED EMBODIMENTS

Figure 1:
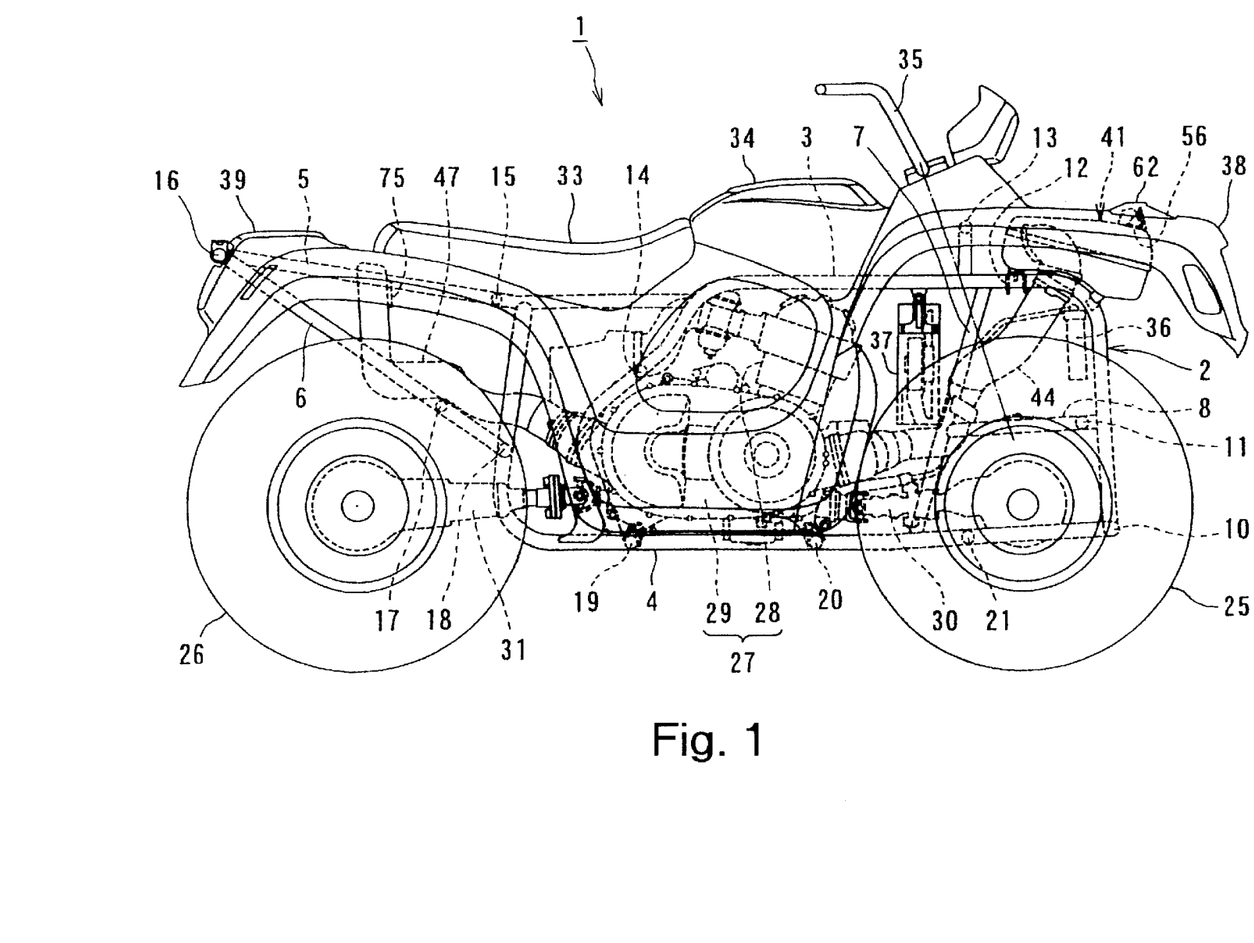
FIG. 1 is a side view illustrating a saddle-mounted type four-wheel vehicle to which the present invention has been applied.
Figure 2:
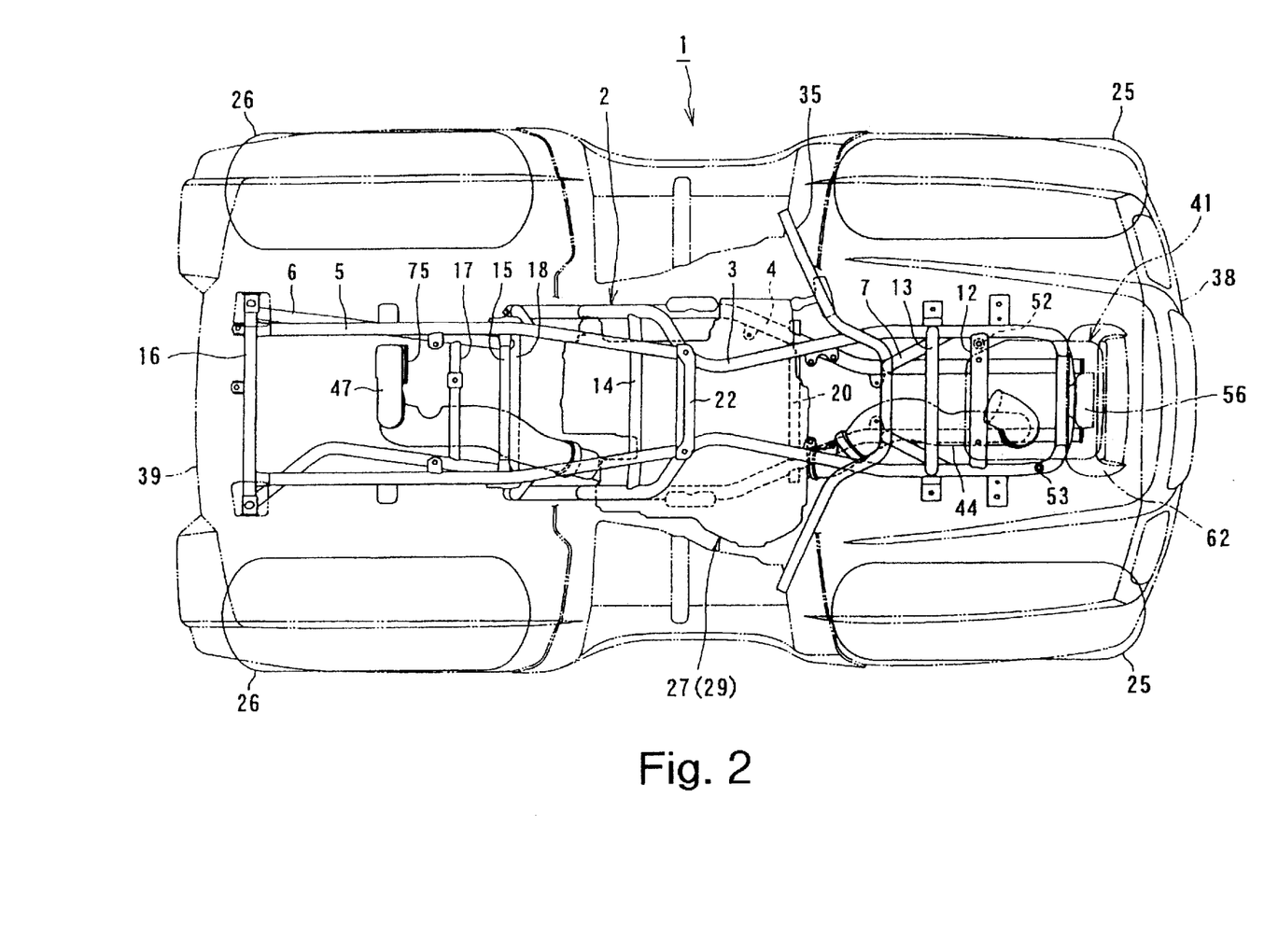
FIG. 2 is a plan view illustrating a saddle-mounted type four-wheel vehicle to which the present invention has been applied.

A preferred embodiment of the present invention is described below with reference to the drawings. FIG. 1 is a side view showing an example of a saddle type four-wheel vehicle to which the present invention has been applied and FIG. 2 is a plan view thereof.

This saddle-type four-wheel vehicle 1 includes a vehicle frame 2 made, for example, of steel tubes. Vehicle frame 2 is constructed in an approximately cage shape, including a pair of left and right front upper pipes 3 and front lower pipes 4, a pair of left and right rear upper pipes 5 and rear lower pipes 6, a pair of left and right upright pipes 7 effecting linkage in the vertical direction between the front upper pipes 3 and front lower pipes 4 at the front, a pair of left and right transverse pipes 8 effecting linkage in the forwards/rearwards direction between these upright pipes 7 and the front of front upper pipes 3, and a plurality of bridge members 10 to 22 effecting linkage in the vehicle width direction between the pairs of left and right members 3 to 8.

Pairs of left and right front wheels 25 and rear wheels 26 are arranged by means of suspension mechanisms, not shown, at the front and rear of vehicle frame 2. An engine unit 27 is mounted on vehicle frame 2 so as to be positioned between these front and rear wheels 25 and 26. The engine unit 27 is integrally constructed of, for example, a 4-cycle single-cylinder engine 28 and a belt-type variable transmission 29. The output of engine 28 is continuously varied in transmission ratio by means of belt-type variable transmission 29 before being transmitted to front and rear wheels 25 and 26 through drive shaft mechanisms 30 and 31.

A saddle-mounted type seat 33 is provided on the rear upper pipe 5 of vehicle frame 2. Fuel tank 34 is arranged in front of the seat, and further in front of this there is provided a steering wheel or handle 35 for steering the front wheels 25. Also, the front portion of vehicle frame 2 extends to approximately above the axle shaft of the front wheels 25 and in the vicinity of the foremost portion thereof there is provided a heat exchanger 36 of the engine unit 27, such as a radiator or oil cooler. A cooling fan 37 for cooling the engine unit 27 is arranged behind the heat exchanger.

Also, a front cover 38 that covers the top of front wheels 25 and the front portion of vehicle frame 2 is provided at the front of the vehicle and a rear cover 39 that covers the top of rear wheels 26 and the rear portion of vehicle frame 2 is provided at the rear of the vehicle. These covers 38 and 39 may be formed of synthetic resin moldings.

Figure 3:
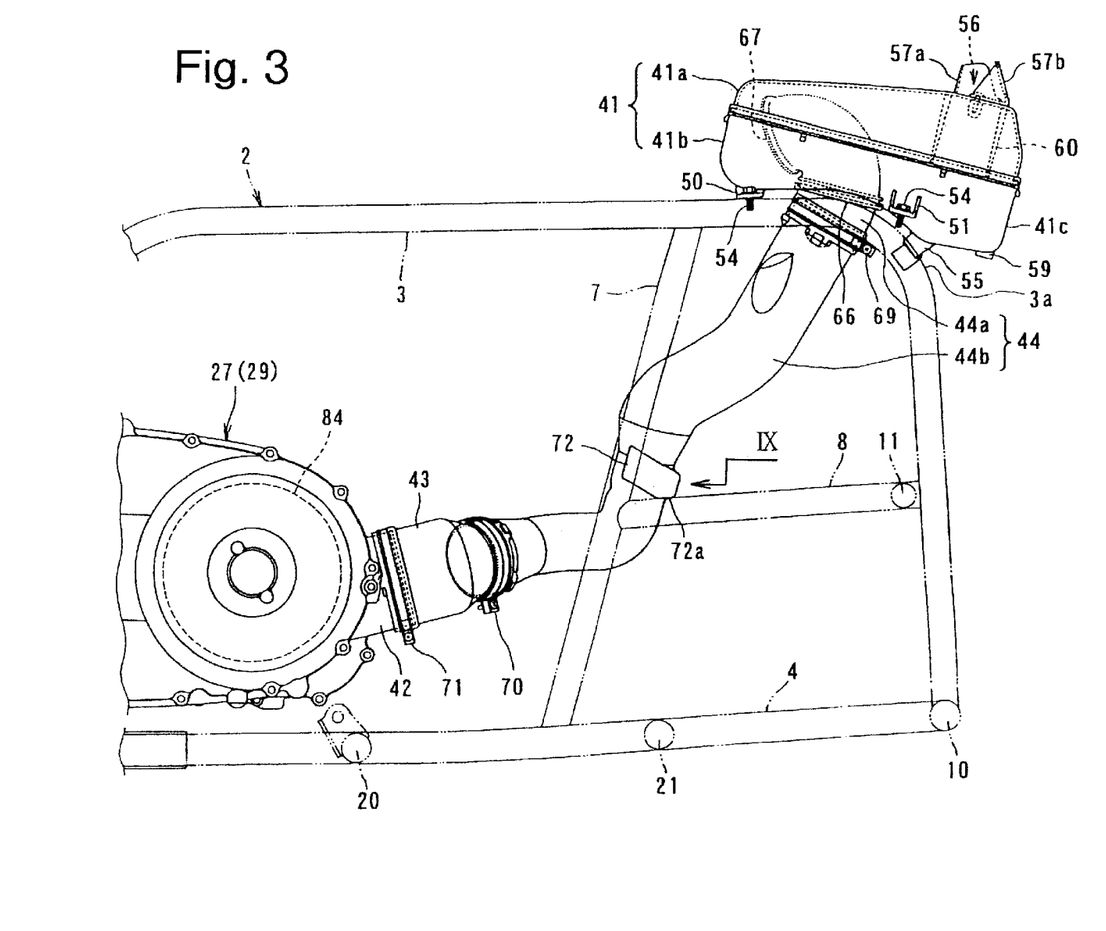
FIG. 3 is a side elevation of the front half of the vehicle frame, belt-type variable transmission, induction box and inlet duct.
Figure 4:
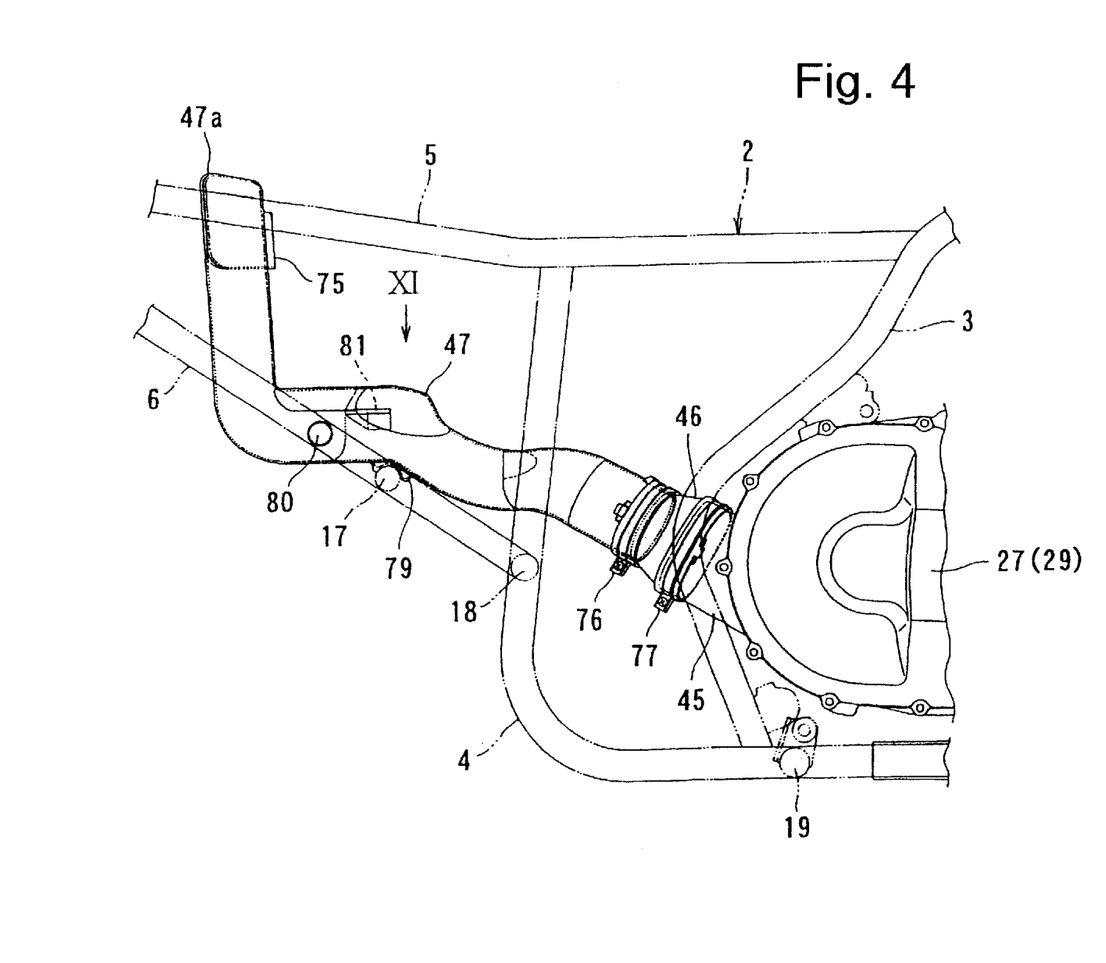
FIG. 4 is a side elevation of the rear half of the vehicle frame, belt-type variable transmission and outlet duct.

Furthermore, as shown in FIG. 3, an induction box 41, which may be formed in any suitable manner, for example as a synthetic resin molding, is provided between the front upper portion of the vehicle frame 2 and front cover 38. This induction box 41 and an intake port 42 that opens at the front of belt-type variable transmission 29 are connected by means of an inlet duct 44 through a connector pipe 43, which may be formed of any suitable material, for example, rubber. As shown in FIG. 4, outlet duct 47 is connected through a connector pipe 46, formed of a suitable material, such as rubber, with an exhaust port 45 that opens at the rear of belt-type variable transmission 29. Inlet duct 44 and outlet duct 47 may both be formed in any suitable manner, for example as synthetic resin moldings. Inlet duct 44 is of a two-piece construction comprising upper duct 44a and main duct 44b, while outlet duct 47 is of a one-piece construction.

Figure 5:
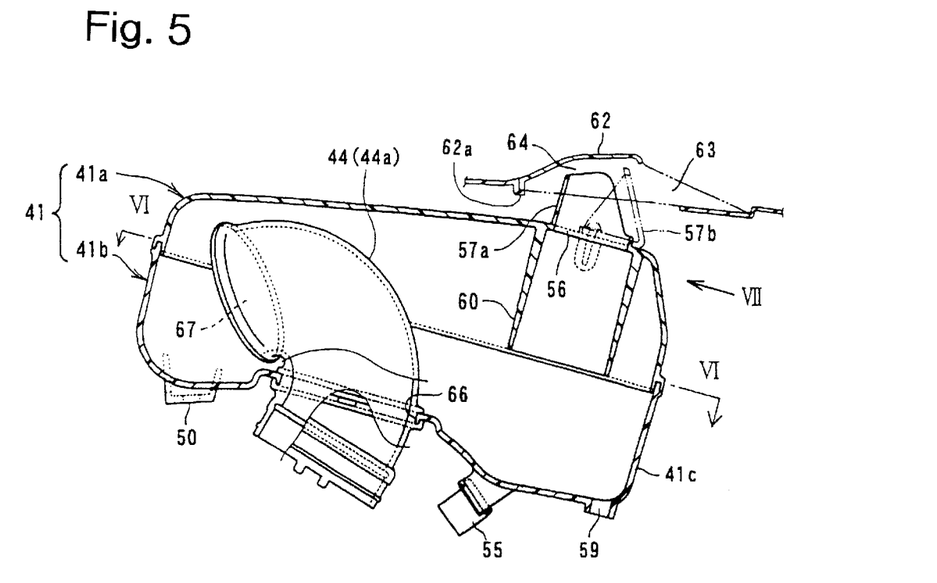
FIG. 5 is a vertical cross-sectional view illustrating an induction box, upper duct and air intake.
Figure 6:
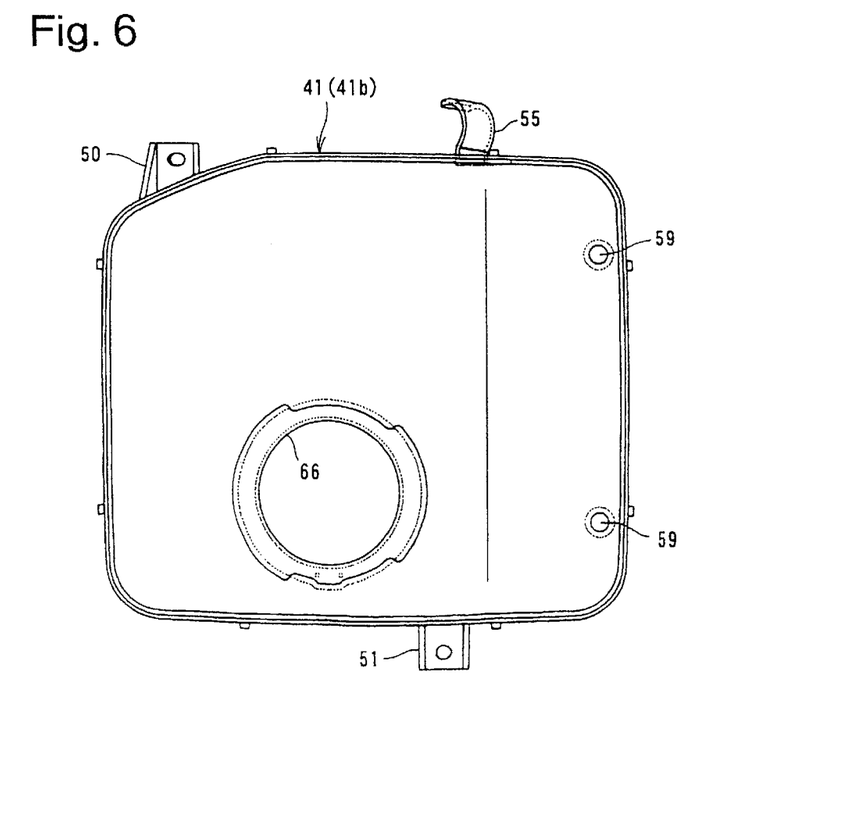
FIG. 6 is a plan view of a lower box taken along line VI—VI of FIG. 5.

As shown in FIGS. 5 and 6, induction box 41 forms an airtight box shape produced by the fitting together of upper box 41a and lower box 41b, which may be formed of any suitable material, such as molded of synthetic resin. Fixing elements 50, 51 provided on the left side rear portion and right side front portion of lower box 41b are fixed by bolts 54 (see FIG. 3) to fixed nuts 52, 53 (see FIG. 2) at the upper front portion of vehicle frame 2, while a fitting element 55 provided on the left side front portion of lower box 41b is engaged with the outer circumferential face of the left side front upper pipe 3 of vehicle frame 2, the entire induction box 41 being thereby positioned on the upper front part of the vehicle frame 2 and fixed.

Figure 7:
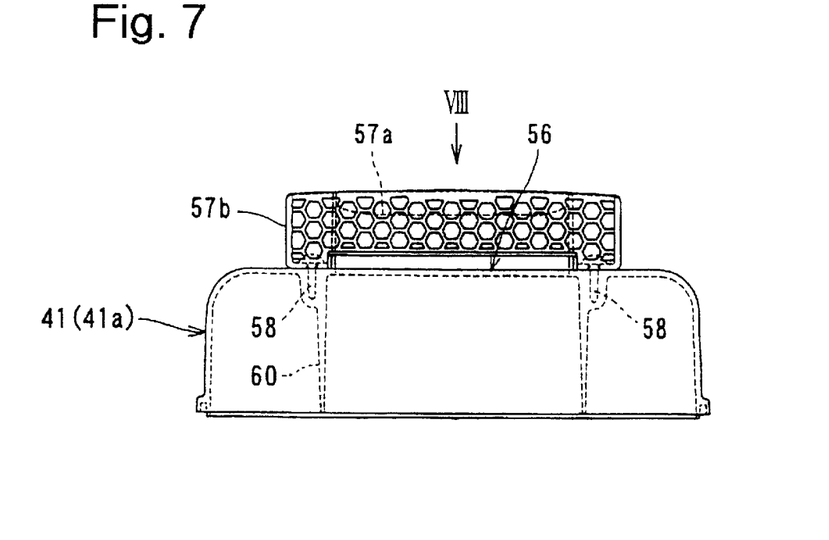
FIG. 7 is a view along arrow VII of FIG. 5.
Figure 8:
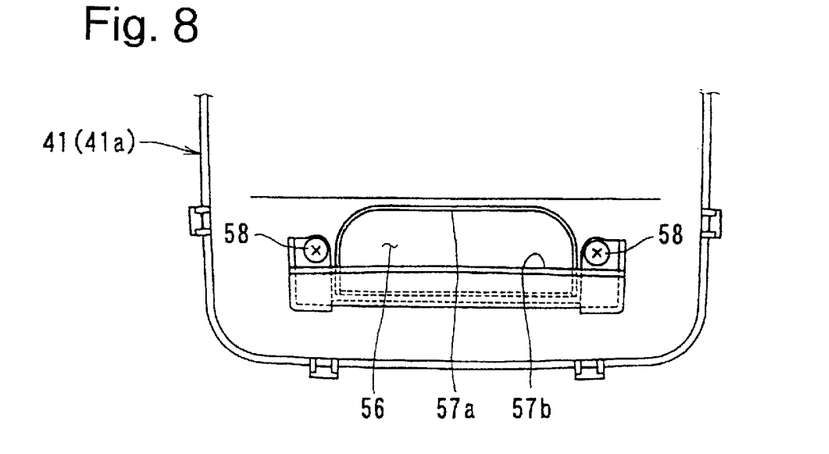
FIG. 8 is a view along arrow VIII of FIG. 7.

At the front of the upper face of induction box 41 (upper box 41a), there is provided a cooling air induction port 56 which opens adjacent the bottom face of front cover 38. As shown in FIGS. 7 and 8, screening plates 57a, 57b are erected so as to enclose the outer periphery of this cooling air induction port 56, which is formed as a transverse slot. Screening plate 57a is formed unitarily and in one piece with upper box 41a so as to be positioned at the rear edge and left and right edges of cooling air induction port 56, while screening plate 57b is formed as a perforated plate, screwed onto upper box 41a by two screws 58 so as to be positioned at the front edge of the cooling air induction port 56.

In side elevation of the vehicle (see FIG. 3), above the foremost part of vehicle frame 2, a forwardly descending portion 3a is formed by bending the front upper pipe 3 so as to make it curved, induction box 41 being arranged on top of this forwardly descending portion 3a. Also, a chamber portion 41c is formed (see also FIG. 5) that projects downwards in a shape approximately matching the outer shape of the forwardly descending portion 3a at the front of the bottom face of induction box 41 (lower box 41b). Consequently, the bottom face of induction box 41 (lower box 41b) is tilted in a forwardly descending fashion. Also, cooling air induction port 56 is positioned above chamber portion 41c which is the lowermost portion of this inclination, and a water discharge hole 59 is provided at the deepest part (most forward part) of chamber portion 41c. Also, on the inside of upper box 41a, a guide cylinder 60 is formed unitarily and in one piece so as to surround the periphery of cooling air induction port 56. This guide cylinder 60 extends towards chamber portion 41c, which is the lowest part of the bottom face of induction box 41.

Also, as shown in FIGS. 1, 2 and 5, an air intake guide 62 of a shape that protrudes upwards is provided on front cover 38, a cooling air intake port 63 being formed that opens in front of this air intake guide 62. The tips of screening plates 57a, 57b that surround the cooling air induction port 56 of induction box 41 project to the inside of the protruding shape of air intake guide 62, a gap 64 being provided between the tips of screening plates 57a, 57b and air intake 62. It should be noted that air intake guide 62 may be a separate component from front cover 38, a flange 62a for fitting purposes provided at its rear edge extending downwards and being positioned to the rear of screening plates 57a, 57b.

A duct connecting port 66 (see FIGS. 5 and 6) is provided in the rear of the bottom face of induction box 41 (lower box 41b). Upper duct 44a constituting the most upstream portion of inlet duct 44 is fitted into connecting port 66 in any suitable airtight fashion, so that most of the upper duct 44a penetrates within induction box 41. Upper duct 44a is bent rearwardly within induction box 41 so that its aperture 67 opens remote from cooling air induction port 56 in induction box 41. Aperture 67 in this embodiment opens on the opposite side to the direction of forward movement of the vehicle (i.e., rearwardly). Also, aperture 67 is arranged at a higher position than the bottom face of induction box 41.

The ends of the main duct 44b of the inlet duct 44 are respectively fitted with the inner circumference of upper duct 44a and the inner circumference of connector pipe 43, and fixed by fixing bands 69, 70. Connector pipe 43 is fitted onto the outer circumference of air inlet port 42 of belt-type variable transmission 29 and is fixed by fixing band 71. At approximately the middle of inlet duct 44, positioning elements are provided that position this portion with respect to the structural members constituting the front of vehicle frame 2.

Figure 9:
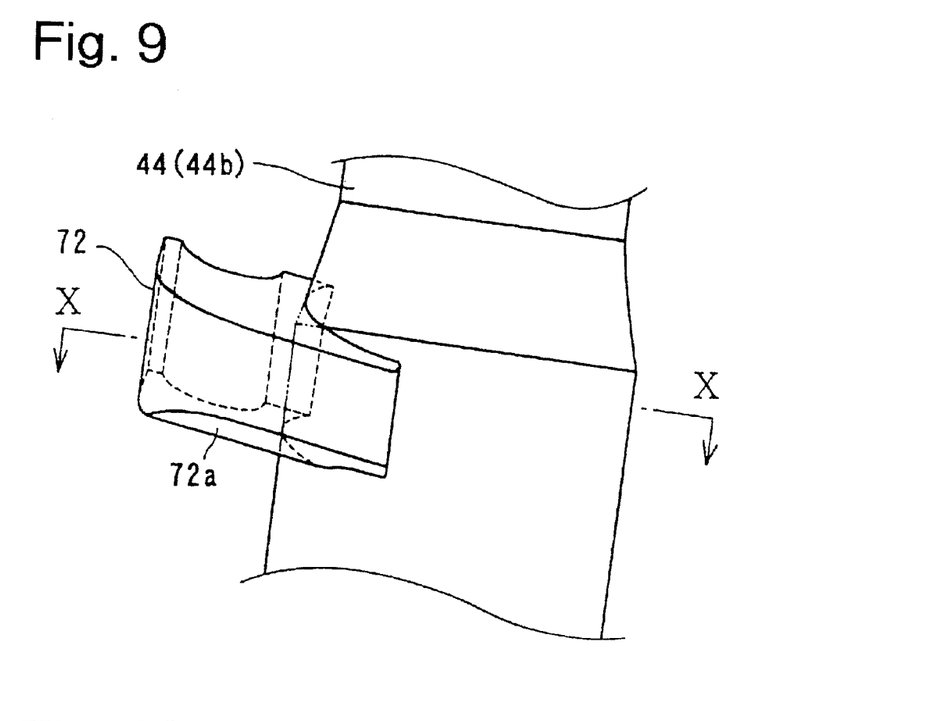
FIG. 9 is a view along arrow IX of FIG. 3.
Figure 10:
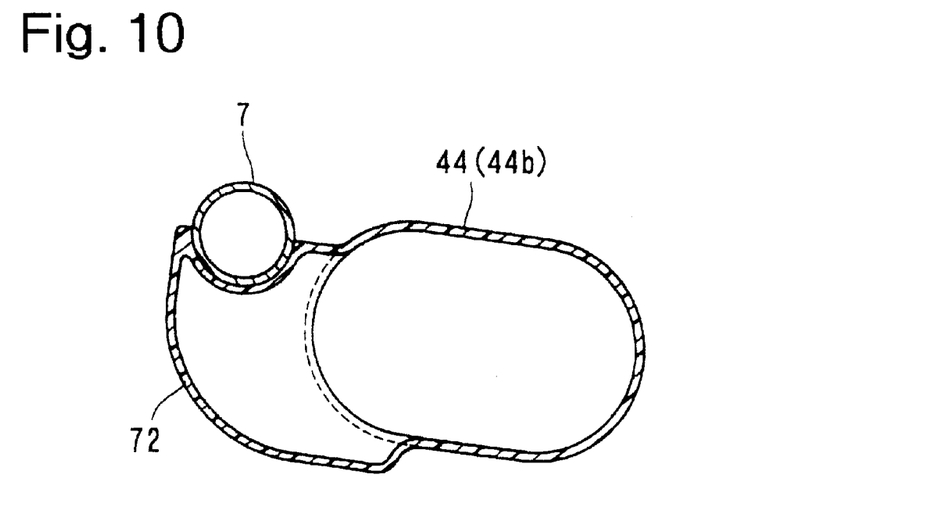
FIG. 10 is a cross-sectional view taken along line X—X of FIG. 9.

As an example of these positioning elements, as shown in FIGS. 9 and 10, a fitting hook 72 is formed unitarily and in one piece with the main duct 44b in approximately the middle of the main duct 44b. This fitting hook 72 is tightly fitted from the front, for example, onto the radially outer face of upright pipe 7 on the front right-hand side of vehicle frame 2, with its bottom face 72a placed above the right-hand side transverse pipe 8.

Also, as shown in FIG. 1, a layout is adopted such that inlet duct 44 passes between the heat exchanger 36 and cooling fan 37 and extends rearwards passing below cooling fan 37 to be connected with inlet port 42 (connector pipe 43) of belt-type variable transmission 29.

Figure 11:
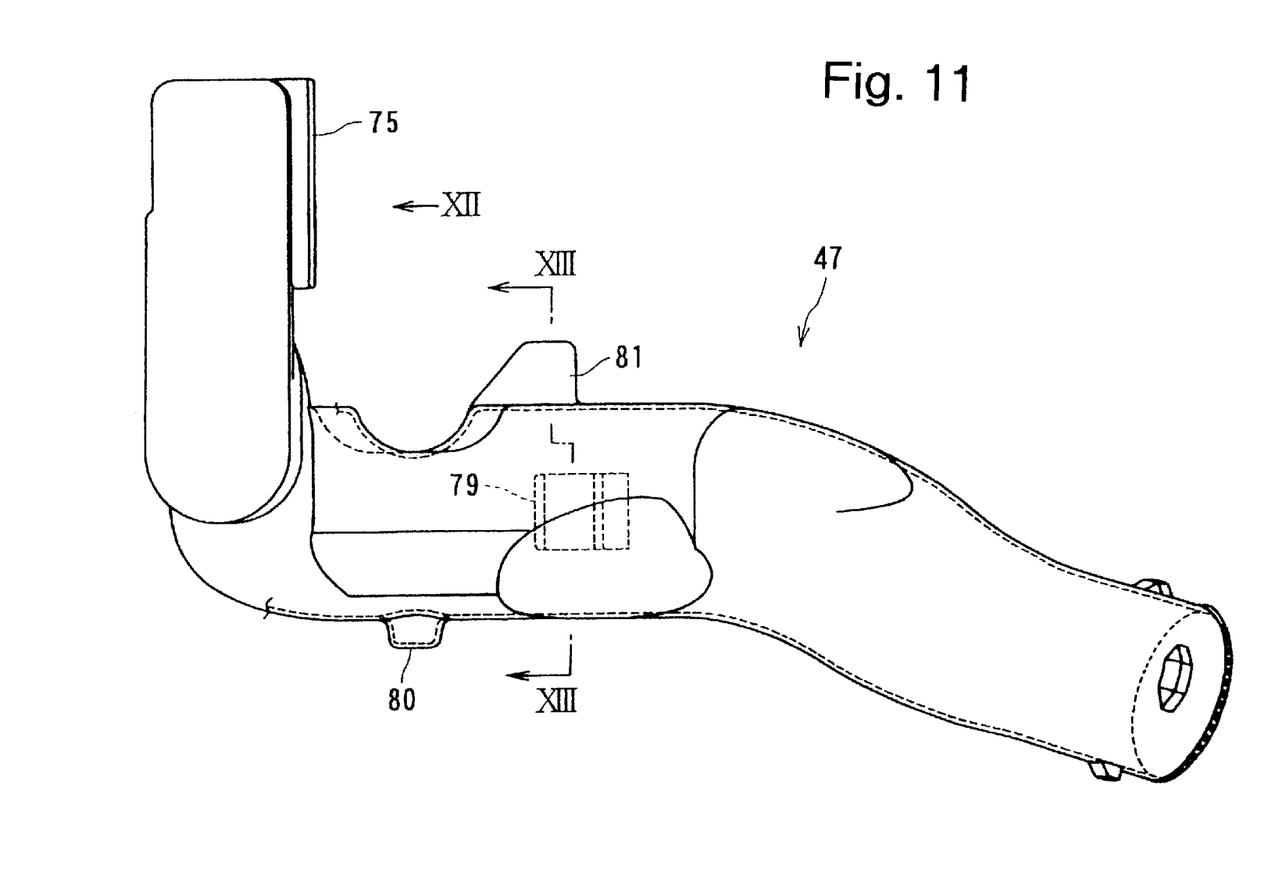
FIG. 11 is a plane view of an outlet pipe along arrow XI of FIG. 4.
Figure 12:
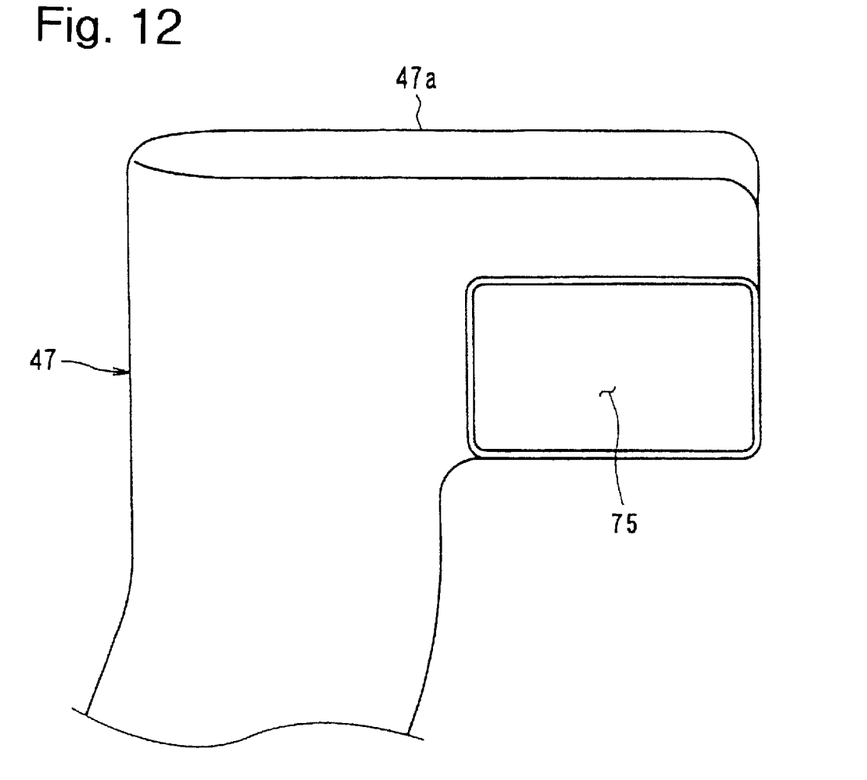
FIG. 12 is a view along arrow XII of FIG. 11.

In contrast, as shown in FIGS. 4, 11 and 12, outlet duct 47 extends rearwardly at an angle upward from the exhaust port 45 (connector pipe 46) of belt-type variable transmission 29 and then changes in direction upward at a sharp angle above the axle shaft of rear wheels 26 then again changes in direction toward the left side of the vehicle directly below the rear end of seat 33, so that cooling air exhaust port 75 which opens to outside at the most downstream end thereof is arranged so as to open forwardly.

Regarding the height of cooling air exhaust port 75, this is positioned lower than the highest part 47a of outlet duct 47 as a whole, and is arranged in a position such that cooling air induction port 56 of induction box 41 is higher than this cooling air exhaust port 75. It should be noted that the upstream end of outlet duct 47 is fitted into the inner circumference of connector pipe 46 and fixed by fixing band 76, and connector pipe 46 is fitted on to the outer circumference of exhaust port 45 of belt-type variable transmission 29 and fixed by fixing band 77.

Figure 13:
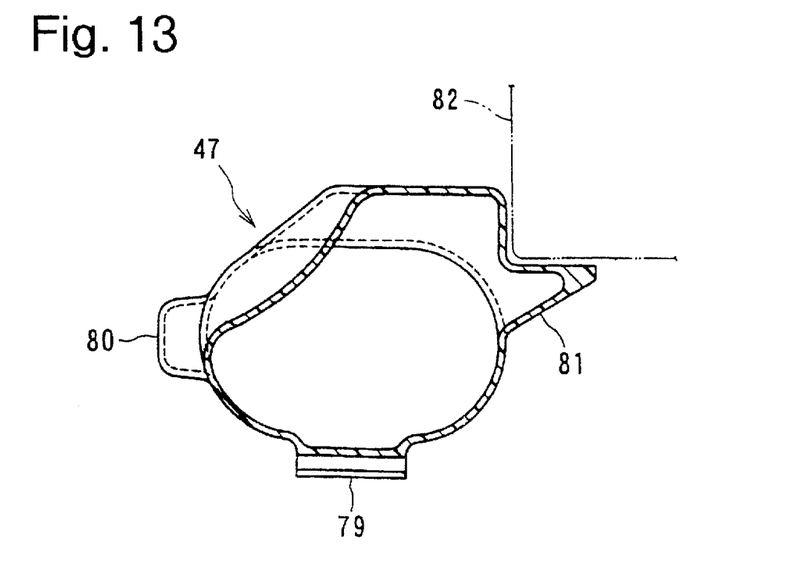
FIG. 13 is a cross-sectional view of an outlet pipe taken along line XIII—XIII of FIG. 11.

Also, at approximately the middle of outlet duct 47, positioning elements are provided that position this portion with respect to the structural members of the vehicle frame. As an example of these positioning elements, as shown in FIGS. 11 and 13, an engagement portion 81, fitting hook 79 and abutment part 80 are formed unitarily and in one piece with outlet duct 47 in approximately the middle of outlet duct 47.

Fitting hook 79 has a shape fitting tightly and arranged above the radially outer face of a bridge member 17 that extends in the vehicle width direction at the rear of vehicle frame 2, so as to restrict movement of outlet duct 47 downwards and in the forward/rearward direction. In contrast, abutment part 80 is positioned in the vicinity of the rear part on the right-hand side of fitting hook 79 and abuts the inside face of the rear lower pipe 6 on the right-hand side of vehicle frame 2, so as to restrict movement of outlet duct 47 in the rightward direction. Also, engagement part 81 is positioned on the opposite side to abutment part 80, engaging the corner part formed by the side face and the bottom face of an article accommodating box 82 that is arranged below seat 33, so as to restrict movement of outlet duct 47 upwards and leftwards. As an example, article accommodating box 82 may be a battery box. However, any other kind of box, such as a tool box, may be employed, and article accommodating box 82 may or may not have a cover.

When engine unit 27 is operated, blower fan 84, which is arranged for integral rotation with the drive pulley within belt-type variable transmission 29, is rotated causing negative pressure to be applied to inlet duct 44, resulting in external air being sucked as cooling air into induction box 41 through air intake guide 62 (cooling air intake port 63) of front cover 38 and cooling air induction port 56 of induction box 41. This cooling air is sucked into the interior of belt-type variable transmission 29 through inlet duct 44 and connector pipe 43.

After the cooling air has cooled the various members within belt-type variable transmission 29, such as the drive pulley, driven pulley and belt, it passes through connector pipe 46 and outlet duct 47 and is discharged to the outside from cooling air exhaust port 75. It should be noted that, when saddle-mounted type four-wheel vehicle 1 is proceeding forwardly, the running air current flowing from the front is forced into air intake guide 62 and induction box 41, increasing the rate of supply of cooling air into belt-type variable transmission 29 and thus increasing the cooling efficiency.

Since induction box 41 is fixed to the side of vehicle frame 2 rather than to the side of the front cover 38, relative change of position, caused by running vibration and/or impacts, between induction box 41 and the belt-type variable transmission 29 of engine unit 27, which is likewise fixed to vehicle frame 2, cannot occur. Such relative position change, along with separation of inlet duct 44 from induction box 41 or belt-type variable transmission 29, or damage thereto can, be effectively prevented by the positioning of approximately the middle portion of inlet duct 44 on vehicle frame 2 (7, 8) by the positioning element (fitting hook 72).

Furthermore, since movement of inlet duct 44 is restrained by fitting hook 72, which is formed unitarily and in one piece with inlet duct 44, fitting with vertical pipe 7 of vehicle frame 2 and carried on transverse pipe 8, inlet duct 44 can be reliably positioned without any use of fasteners such as nuts or bolts. The construction for fixing of inlet duct 44 can therefore by simplified.

Also, since the cooling air induction port 56 provided on the front portion of the upper face of induction box 41 opens in the vicinity of the bottom face of front cover 38, foreign matter such as water, mud, sand or dust raised by the front wheels 25 during running can be prevented from being sucked into cooling air induction port 56 (inlet duct 44).

Furthermore, due to the fact that the tips of screening plates 57a and 57b which surround the outer circumference of cooling air induction port 56 penetrate into the inside of the protrusion of air intake guide 62 provided on front cover 38, and due to the fact that flange 62a is formed on the rear edge of air intake guide 62, foreign matter such as water, mud, sand or dust raised by the front wheels 25 is screened by the screening plates 57a, 57b and/or flange 62a, making it difficult for this foreign matter to directly enter the cooling air induction port 56 of induction box 41. In particular, water or mud flowing forward along the inside face of front cover 38 is obstructed by flange 62a and cannot penetrate into cooling air induction port 56.

It should be noted that, since screening plate 57b positioned at the front edge of cooling air induction port 56 is formed as a perforated plate, foreign matter can be prevented from entering cooling air induction port 56 and a considerable reduction in air induction resistance thereby achieved. Also, since a gap 64 is provided between the tips of screening plates 57a, 57b and air intake guide 62, contact between screening plates 57a, 57b and air intake guide 62 during vehicle running can be prevented, thereby preventing generation of abnormal noise and/or damage.

Since induction box 41 is provided above forwardly descending part 3a formed at the top of the foremost portion of vehicle frame 2 with a chamber portion 41c projecting downwards in a form substantially corresponding to the external shape of forwardly descending portion 3a at the front part of the bottom face of induction box 41, and a water discharge hole 59 is provided at the lowest part (foremost part) of this chamber portion 41, large capacity of the induction box 41 can be maintained without raising the height of the upper surface of front cover 38, thereby reducing air induction resistance and making it possible to effectively discharge moisture that has penetrated into induction box 41.

The bottom face of induction box 41 is inclined in approximately forwardly descending fashion, cooling air induction port 56 being positioned above chamber portion 41c constituting the lowest part of this inclination. A guide cylinder 60 surrounds the inside circumference of this cooling air induction port 56 and extends towards chamber portion 41c. Upper duct 44a, constituting the most upstream part of inlet duct 44, projects into the interior of induction box 41 from duct connecting port 66, this upper duct 44a being bent backwards so as to be separated from cooling air induction port 56 within induction box 41, aperture 67 being positioned at a higher position that the bottom face of induction box 41. Thus, air that is sucked in from cooling air induction port 56, after first flowing towards the bottom (chamber portion 41c) of induction box 41, is then bypassed to flow into inlet duct 44 which opens thereabove.

Consequently, foreign matter (in particular moisture) contained in the inducted air is easily separated from the air current within the induction box 41 and this foreign matter is left behind in the lowest part of the chamber portion 41c. Meanwhile, the moisture is immediately discharged to the outside from water discharge hole 59 provided at the lowest part of chamber portion 41c. The solid foreign matter that has been left behind in chamber portion 41c and/or the moisture left behind and discharged is at a position above the bottom face of induction box 41 and so cannot be sucked into the aperture 67 of upper duct 44a which opens rearwardly. Consequently, even if foreign matter enters induction box 41 from cooling air induction port 56, this foreign matter has a very low probability of reaching belt-type variable transmission 29 through inlet duct 44, so that a remarkable improvement in durability of the belt-type variable transmission 29 can thereby be achieved.

Also, since inlet duct 44 passes between heat exchanger 36 provided in the vicinity of the foremost portion of vehicle frame 2 and cooling fan 37, and extends rearwardly passing below cooling fan 37, so as to be connected with air induction port 42 of belt-type variable transmission 29, bending of inlet duct 44 is reduced to a minimum, lowering the air induction resistance and also enabling the layout of inlet duct 44 to be improved.

Also, since cooling air induction port 56 of induction box 41 is arranged at a higher position than cooling air exhaust port 75 of outlet duct 47, and cooling air discharge port 75 opens at a lower position than the highest part 47a of the outlet duct 47 as a whole, even if saddle-mounted type four-wheel vehicle 1 dives into a deep water channel at a comparatively steep angle, it is difficult for water to enter through cooling air induction port 56 of induction box 41. Even if water does enter through cooling air discharge port 75, it is difficult for this water to flow into the interior of outlet duct 47.

In level running in a deep-water channel, the cooling air exhaust port 75 of outlet duct 47 is in a position farthest from the water surface since it is positioned above the axle shaft of the rear wheels 26. When exiting the deep water channel, the attitude of the vehicle becomes raised at the front, so cooling air discharge port 75 is brought close to the water surface. Accordingly, by having cooling air exhaust port 75 open towards the front of the vehicle and providing cooling air exhaust port 75 at a position a little lower than the highest part 47a of outlet duct 47, entry of water into outlet duct 47 is prevented, making it possible to improve durability of the belt-type variable transmission 29.

Furthermore, providing a positioning element that is formed unitarily and in one piece in approximately the middle of outlet duct 47, this positioning element including a fitting hook 79 placed above the radially outer surface of a bridge member 17 of a vehicle frame 2, an abutment part 80 that abuts the inner surface of rear lower pipe 6 on the right-hand side of vehicle frame 2, and an engagement part 81 that engages a corner of article accommodating box 82 below seat 33, reliable positioning of outlet duct 47 can be achieved while maintaining simplicity of the construction of outlet duct 47, thereby restraining the movement of the outlet duct 47 with respect to vehicle frame 2 and making it possible to reliably prevent damage to outlet duct 47 or its separation from the belt-type variable transmission 29.

As described above, with a saddle-mounted type four-wheel vehicle according to the present invention, separation or damage of the inlet duct and outlet duct connected to the belt-type variable transmission can be suppressed and induction of foreign matter such as water, mud, sand or dust into the inlet duct can be prevented, thereby improving durability of the belt-type variable transmission and making possible lowering of air induction resistance, simplification of construction and improvements in layout of the inlet duct.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Application No. 2001-083402 filed on Mar. 22, 2001, the disclosure of which is herein expressly incorporated by reference it its entirety.

What is claimed is:

1. A saddle-mounted type four-wheel vehicle, comprising:
   a vehicle frame;
   left and right front wheels and rear wheels provided at the front and rear of said vehicle frame;
   an engine unit including an engine and a variable transmission, said engine unit being mounted on said vehicle frame between said front and rear wheels;
   a saddle seat provided at the top of said vehicle frame;
   a steering handle provided in front of said seat;
   a front cover that covers said front wheels and an upper front part of said vehicle frame;
   an induction box provided between the upper front part of said vehicle frame and said front cover, said induction box being fixed directly to said vehicle frame and including a cooling air induction port provided in an upper face thereof adjacent to a bottom face of said front cover;
   an inlet duct connecting a duct linkage port provided in a bottom face of said induction box and an air induction port of said variable transmission;
   a first positioning element formed in a portion of said inlet duct for positioning the portion of said inlet duct with respect to structural members of said vehicle frame;
   an outlet duct connecting a discharge port of said variable transmission and a cooling air discharge port provided at a downstream end of said outlet duct; and
   a second positioning element formed in a middle portion of said outlet duct for positioning the middle portion of said outlet duct with respect to structural members of said vehicle frame.

2. The saddle-mounted four-wheel vehicle according to claim 1, wherein the portion of said inlet duct at which said first positioning element is formed is a middle portion of said inlet duct.

3. The saddle-mounted four-wheel vehicle according to claim 1, wherein said first positioning element is a fitting hook that fits tightly on a surface of an upright portion of said vehicle frame, a bottom face of said fitting hook contacting a transverse portion connected to the upright portion.

4. The saddle-mounted four-wheel vehicle according to claim 1, wherein a heat exchanger for said engine unit is provided near the front of said vehicle frame, a cooling fan for cooling said engine unit is provided behind said heat exchanger, and said inlet duct extends downwardly and rearwardly to pass between said heat exchanger and said cooling fan and below said cooling fan, and is connected to the air induction port of said variable transmission.

5. The saddle-mounted four-wheel vehicle according to claim 1, wherein the cooling air induction port of said induction box is arranged at a higher position than the cooling air discharge port of said outlet duct, the cooling air discharge port is arranged at a lower position than a highest part of said outlet duct, and the cooling air discharge port is arranged on a front face side of said outlet duct.

6. The saddle-mounted four-wheel vehicle according to claim 1, wherein said second positioning element includes:
   a fitting hook that fits tightly on a cross member of said vehicle frame which extends in a width direction;
   an abutment portion that abuts on a side face of a structural member of said vehicle frame; and
   an engagement part that engages a corner formed by a side face and a bottom face of an article accommodating box arranged below said seat.

7. The saddle-mounted four-wheel vehicle according to claim 1, wherein said vehicle frame includes a forwardly descending portion formed at the upper front part of said vehicle frame;
   said induction box being arranged above said forwardly descending portion and including a chamber portion formed at the front of said induction box, a bottom face of said chamber portion extending downwardly with a shape substantially corresponding to a shape of said forwardly descending portion; and
   a water discharge hole being provided at the lowest part of said chamber portion.

8. The saddle-mounted four-wheel vehicle according to claim 1, wherein an upstream part of said inlet duct projects into the interior of said induction box through the duct linkage port and bends in a direction away from the cooling air induction port within said induction box.

9. The saddle-mounted four-wheel vehicle according to claim 1, wherein screening plates extend from the upper face of said induction box and surround the cooling air induction port;
   an air intake guide protrudes above said front cover;
   a cooling air intake port is formed at the front of said air intake guide; and
   said screening plates project within said air intake guide.

10. The saddle-mounted four-wheel vehicle according to claim 1, wherein the bottom face of said induction box is inclined, said cooling air induction port being positioned above a lowest part of the inclined bottom face of said induction box, further including a guide cylinder extending within said induction box and surrounding the cooling air induction port, said cylinder extending toward the lowest part of the inclined bottom face of said induction box.

11. The saddle-mounted four-wheel vehicle according to claim 7, wherein an upstream part of said inlet duct projects into the interior of said induction box through the duct linkage port and bends in a direction away from the cooling air induction port within said induction box.

12. The saddle-mounted four-wheel vehicle according to claim 7, wherein screening plates extend from the upper face of said induction box and surround the cooling air induction port;
    an air intake guide protrudes above said front cover;
    a cooling air intake port is formed at the front of said air intake guide; and
    said screening plates project within said air intake guide.

13. The saddle-mounted four-wheel vehicle according to claim 7, wherein the bottom face of said induction box is inclined, said cooling air induction port being positioned above a lowest part of the inclined bottom face of said induction box, further including a guide cylinder extending within said induction box and surrounding the cooling air induction port, said cylinder extending toward the lowest part of the inclined bottom face of said induction box.

14. The saddle-mounted four-wheel vehicle according to claim 8, wherein screening plates extend from the upper face of said induction box and surround the cooling air induction port;
    an air intake guide protrudes above said front cover;
    a cooling air intake port is formed at the front of said air intake guide; and
    said screening plates project within said air intake guide.

15. The saddle-mounted four-wheel vehicle according to claim 8, wherein the bottom face of said induction box is inclined, said cooling air induction port being positioned above a lowest part of the inclined bottom face of said induction box, further including a guide cylinder extending within said induction box and surrounding the cooling air induction port, said cylinder extending toward the lowest part of the inclined bottom face of said induction box.

16. The saddle-mounted four-wheel vehicle according to claim 9, wherein the bottom face of said induction box is inclined, said cooling air induction port being positioned above a lowest part of the inclined bottom face of said induction box, further including a guide cylinder extending within said induction box and surrounding the cooling air induction port, said cylinder extending toward the lowest part of the inclined bottom face of said induction box.

17. The saddle-mounted four-wheel vehicle according to claim 9, wherein, a screening plate positioned at a front edge of the cooling air induction port is a perforated plate.

18. The saddle-mounted four-wheel vehicle according to claim 9, wherein a gap is provided between tips of said screening plates and said air intake guide.

19. The saddle-mounted four-wheel vehicle according to claim 17, wherein a gap is provided between tips of said screening plates and said air intake guide.

20. An air cooling system for a vehicle transmission, said system comprising:
    an induction box fixed directly to a vehicle frame and including a cooling air induction port provided in an upper face thereof;
    an inlet duct connecting a duct linkage port provided in a bottom face of said induction box and an air induction port of a vehicle transmission;
    a first positioning element formed in a portion of said inlet duct for positioning the portion of said inlet duct with respect to structural members of the vehicle frame;
    an outlet duct connecting a discharge port of the vehicle transmission and a cooling air discharge port provided at a downstream end of said outlet duct; and
    a second positioning element formed in a middle portion of said outlet duct for positioning the middle portion of said outlet duct with respect to structural members of said vehicle frame.

21. The air cooling system for a vehicle transmission according to claim 20, wherein the cooling air induction port of said induction box is arranged at a higher position than the cooling air discharge port of said outlet duct, the cooling air discharge port is arranged at a lower position than a highest part of said outlet duct, and the cooling air discharge port is arranged on a front face side of said outlet duct.

22. The air cooling system for a vehicle transmission according to claim 20, wherein the portion of said inlet duct at which said first positioning element is formed is a middle portion of said inlet duct.

23. The air cooling system for a vehicle transmission according to claim 20, wherein said first positioning element is a fitting hook that fits tightly on a surface of an upright portion of the vehicle frame, a bottom face of said fitting hook contacting a transverse portion connected to the upright portion.

24. The air cooling system for a vehicle transmission according to claim 20, wherein said second positioning element includes:
    a fitting hook that fits tightly on a cross member of the vehicle frame which extends in a width direction;
    an abutment portion that abuts on a side face of a structural member of the vehicle frame; and
    an engagement part that engages a corner formed by a side face and a bottom face of an article accommodating box arranged below a vehicle seat.

25. An air cooling system for a vehicle transmission, said system comprising:
    an induction box provided between an upper front part of a vehicle frame and a vehicle front cover, said induction box being fixed directly to the vehicle frame and including a cooling air induction port provided in an upper face thereof adjacent to a bottom face of the front cover, said induction box further including a duct linkage port provided in a bottom face thereof for connection of an inlet duct thereto; and
    an outlet duct connecting a discharge port of a vehicle transmission and a cooling air discharge port provided at a downstream end of said outlet duct, said outlet duct including a positioning element formed in a middle portion thereof for positioning the middle portion of said outlet duct with respect to structural members of the vehicle frame.

26. The air cooling system for a vehicle transmission according to claim 25, wherein an upstream part of the inlet duct projects into the interior of said induction box through the duct linkage port and bends in a direction away from the cooling air induction port within said induction box.

27. The air cooling system for a vehicle transmission according to claim 25, wherein the vehicle frame includes a forwardly descending portion formed at the upper front part thereof;
    said induction box being arranged above said forwardly descending portion and including a chamber portion formed at the front of said induction box, a bottom face of said chamber portion extending downwardly with a shape substantially corresponding to a shape of said forwardly descending portion; and
    a water discharge hole being provided at the lowest part of said chamber portion.

28. The air cooling system for a vehicle transmission according to claim 25, wherein the bottom face of said induction box is inclined, said cooling air induction port being positioned above a lowest part of the inclined bottom face of said induction box, further including a guide cylinder extending within said induction box and surrounding the cooling air induction port, said cylinder extending toward the lowest part of the inclined bottom face of said induction box.

29. The air cooling system for a vehicle transmission according to claim 25, wherein screening plates extend from the upper face of said induction box and surround the cooling air induction port;
    an air intake guide protrudes above said front cover;
    a cooling air intake port is formed at the front of said air intake guide; and
    said screening plates project within said air intake guide.

30. The air cooling system for a vehicle transmission according to claim 29, wherein, a screening plate positioned at a front edge of the cooling air induction port is a perforated plate.

31. The air cooling system for a vehicle transmission according to claim 29, wherein a gap is provided between tips of said screening plates and said air intake guide.

* * * * *

UNITED STATES PATENT AND TRADEMARK OFFICE
CERTIFICATE OF CORRECTION

PATENT NO. : 6,695,083 B2
DATED : February 24, 2004
INVENTOR(S) : E. Nakamura et al.

It is certified that error appears in the above-identified patent and that said Letters Patent is hereby corrected as shown below:

Column 11,
Line 2, after "saddle-mounted" delete "type".

Signed and Sealed this

Fifth Day of October, 2004

JON W. DUDAS
*Director of the United States Patent and Trademark Office*